United States Patent Office 2,922,823
Patented Jan. 26, 1960

2,922,823
2-VINYLCHLOROHEXAFLUOROCYCLOBUTANE

Paul Tarrant, Gainesville, Fla., assignor, by mesne assignments, to Dow Corning Corporation, Midland, Mich., a corporation of Michigan No Drawing. Application July 16, 1958
Serial No. 748,816

1 Claim. (Cl. 260—648)

The present invention relates to a vinylchlorohexafluorocyclobutane of the formula

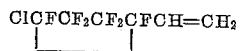

The olefin of this invention can be prepared by reacting $CF_2=CFCH_2CH_2Br$ with $CF_2=CFCl$ at about 200° C., and dehydrobrominating the resulting

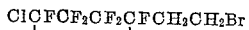

The primary utility of the defined compound lies in its use as an intermediate in reactions with compounds containing silicon-bonded hydrogen to form the corresponding adduct, as is shown in detail in my copending application, filed concurrently herewith, entitled "Halocyclobutyl Substituted Organosilicon Compounds."

Thus, for example, the olefin reacts with $CH_3SiHCl_2$ at about 200° C. to form the compound

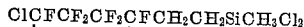

Such a reaction is preferably carried out in the presence of a platinum catalyst, e.g. 5% Pt deposited on powdered charcoal. The adduct can be hydrolyzed with water, using the conventional techniques for organosilane hydrolysis, to produce the corresponding organosiloxane polymers. Such polymers have enhanced resistance to organic solvents.

The olefinic unsaturation of the defined compound also allows this compound to take part in conventional vinylic polymerization and copolymerization reactions.

Example

A stainless steel autoclave having a capacity of 1.4 l. was charged with 1.5 mols of $CF_2=CFCH_2CH_2Br$ and 4.4 mols of $CF_2=CFCl$, and heated at 200° C. for 17 hours. The reaction mass was distilled to yield the compound

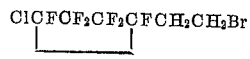

as a fraction boiling at 145–150° C. A solution of 0.84 mol KOH in 175 ml. of 95% ethanol was added dropwise to 0.87 mol of the latter bromide. Precipitated KBr was removed by filtration and the filtrate was heated at reflux for 30 minutes. Volatiles were removed by distillation to a head temperature of 78° C., and the residue was washed with water. After separation, the non-aqueous layer was dried over calcium chloride and fractionated to yield the product

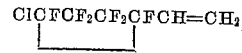

B.P. 83° C., $n_D^{22}$ 1.3468, $d_4^{22}$ 1.4206.

That which is claimed is:

Vinylchlorohexafluorocyclobutane having the formula

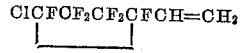

References Cited in the file of this patent

Coffman et al.: Jour. Am. Chem. Soc., vol. 71, pp. 490–496 (1949).